United States Patent Office 3,135,379
Patented June 2, 1964

3,135,379
PHONOGRAPH RECORD CONTAINING
POLYPROPYLENE
Edward A. Naudain, Newark, Del., assignor to Hercules Powder Company, Wilmington, Del., a corporation of Delaware
No Drawing. Filed July 16, 1959, Ser. No. 827,456
3 Claims. (Cl. 260—28.5)

This invention relates to phonograph records and to molding compositions therefor.

Phonograph records of polystyrene and vinyl polymers are commercially successful because of their faithful reproduction of sound with low background noise. However, they both have objectionable characteristics. While polystyrene records on first playing have almost no background noise, such records on repeated playing rapidly develop noise. Records made of vinyl polymers have higher background noise but have much greater resistance to wear so that after long use they are superior to the polystyrene records. Neither polystyrene compositions nor vinyl polymer compositions can be highly filled since they become brittle with small amounts of filler and the polymers in the compositions degrade at the elevated temperatures required for molding. Moreover, records made from both of these polymers attract dust which contributes to noise and wear.

In accordance with the present invention, it has now been found that compositions of linear polypropylene homogeneously blended with a heat stabilizer therefor are moldable into improved phonograph records which are superior to polystyrene or vinyl polymer phonograph records in many respects and do not have the above-mentioned deficiencies. Moreover, the composition of linear polypropylene and a heat stabilizer forms an outstanding binder for filled phonograph record compositions since filled phonograph records made from compositions high in filler content in accordance with this invention are much more flexible than records made from any known plastic composition of comparable filler content. Filled phonograph records of linear polypropylene, a heat stabilizer and a filler as chief components likewise have many of the advantages contributed by the composition of linear polypropylene and stabilizer.

The compositions for unfilled phonograph records contain as the essential plastic component linear polypropylene of RSV in the range of 1.5–5 and about 0.1–5% heat stabilizer based on the polypropylene. In addition, there may be added up to about 5% of an acid stabilizer, up to about 15% of a hard wax, and up to about 15% of high melting thermoplastic resins, these percentages being based on the polypropylene. However, the polypropylene should constitute at least about 50% and preferably at least about 75% of the unfilled phonograph record composition.

The following examples set forth the method of making phonograph records using polypropylene in accordance with this invention. All parts and percentages, unless otherwise indicated, are by weight.

EXAMPLES 1–9.—UNFILLED RECORDS

Unfilled phonograph record compositions were made from linear polypropylene of various viscosities having a heat stabilizer admixed therewith. The compositions were prepared by milling together the ingredients of the composition as set forth in Table 1 on a 2-roll mill heated at the indicated temperature, which is at least about 330° F. and is at or above the plastic melting point of the linear polypropylene, while thoroughly mixing until crystallinity was destroyed, and the fluid composition was then transferred to a record mold bearing a matrix of a musical selection and heated at 280–350° F. as indicated and pressed. Promptly after pressing, the press was cooled by means of water to below about 100° F., generally to about 70° F., at which temperature the mold was held under pressure to allow set to take place before releasing the record. The records when so prepared were warp-free after removal from the mold. The data on these compositions and on records prepared therefrom are set forth in Table 1. Various stabilizers were used to prevent degradation of the polypropylene to lower RSV material at the melting and molding temperatures required in the pressing of the records. Other stabilizers known to prevent degradation of polypropylene due to heat and oxidation may be substituted. The calcium stearate in these examples is used to stabilize against acid degradation and is not necessary for the production of a good phonograph record. Waxes are used to provide lubrication of the record and thus to reduce wear and lower needle drag. By the term "wax" is meant any normally solid organic material which reduces friction and is slippery. The wax is thus not limited to the classic definition, but includes the esters of high molecular weight acids and alcohols, high molecular weight paraffins, fossil waxes, animal waxes, vegetable waxes, mineral waxes, and other slippery materials with wax-like properties. The process of preparing the phonograph records according to these examples differs from the usual process in that the polypropylene is rendered noncrystalline by heating to the melting point of the polypropylene before molding and the molded record is cooled for a longer period while under pressure in the mold than usual so as to maintain the shape of the record. The combined pressing and cooling time is thus somewhat longer than is required in pressing of styrene or vinyl records.

All of the records of Examples 1–9 had better wearing qualities than styrene records and better strength than either styrene or vinyl records.

The compositions useful for unfilled phonograph records are also useful as binder compositions for filled phonograph records. Fillers are particularly advantageous not only because they increase wear, strength, and dimensional stability, but because they reduce tendency to warping. Moreover, since filled records are lower in price than unfilled records, the ability of the present compositions to be highly filled is a particularly great economic advantage. The following examples illustrate the use of fillers.

EXAMPLES 10–19.—FILLED RECORDS

In Examples 10–19 commercial polypropylene RSV 3.5 molding powder containing 0.1% stabilizer A, 0.25% stabilizer B and 0.4% calcium stearate was used. In Examples 17 and 18 an alkyl phenol sulfide was used as the sole stabilizer added in the milling step while heating to molding temperature. This molding powder was milled on a 2-roll mill at about 330° F. to destroy crystallinity, and the filler, resins, and wax were incorporated in the usual manner. The composition, while still hot, was transferred from the mill to the press. The filled compositions are less fluid at 330° F. than the unfilled compositions and high press temperatures are necessary rather than optional. In the present examples, the temperature limitation of the equipment prevented the use of higher temperatures, but tests showed that the compositions can be safely subjected to higher temperatures and molded successfully. The time of milling, pressing and cooling in these examples is less critical than in the case of unfilled records but requires adjustment according to the fluidity which decreases with increase in filler content. The filled records have dimensional stability which is greater than that of unfilled records in proportion to the amount of filler, and the cooling time is also proportionately less than in the case of an unfilled record. In either case, set must be established before releasing from the mold. The time to set takes 20 to 120 seconds. The filled records of these examples were superior to either styrene or vinyl records. Moreover, their increased hardness and strength are a substantial improvement over unfilled polypropylene records of Examples 1-9 without any loss in their high fidelity characteristics.

Linear polypropylene as noted above has an added advantage of maintaining flexibility over a much wider range of filler content than any material heretofore used in the phonograph record art. Thus, while a filled polypropylene phonograph record of 50% filler content of Example 11 has an angle of bend of 51°, a corresponding vinyl acetate chloride record of 50% filler content shows an angle of bend of only 7.4° without breaking. Furthermore, as much as 75% filler may be incorporated in a polypropylene record (Example 10) before an angle of bend as low as 7° is reached, while a corresponding vinyl acetate chloride phonograph record cannot even be molded because of lack of plasticity.

The polypropylene used in the phonograph records of this invention is linear polypropylene which is normally solid and highly crystalline. The polypropylene will vary somewhat in its melting point, molecular weight, and RSV (reduced specific viscosity, i.e., specific viscosity/concentration) according to variations in the process of manufacture. However, the polypropylene is useful over a wide range of properties and it may have the following range of these physical properties: melting point 165° to 170° C., weight average molecular weight 150,000 to 600,000, RSV (calculated from specific viscosity determined on a 0.1% solution in decahydronaphthalene at 135° C.) 1.5 to 5 and preferably 2 to 3.5. Methods of making suitable polypropylene for use in accordance with this invention are now well known in the art.

Stabilizers which may be used with polypropylene in the compositions of this invention include stabilizers such as dibutyl tin laurate, epichlorohydrin-bisphenol reaction products, phenolic oxidation inhibitors such as t-butyl-p-cresol, p-phenylphenol, and other alkylated phenols, organo-tin mercaptide stabilizers, zinc, cadmium, and barium chelate compounds, acetone condensates of cresol and higher alkyl phenols particularly nonyl phenol-acetone condensates which include bisphenol homologs and the substituted chromans produced by ring closure, hydroquinone monobenzyl ether, alkyl phenol sulfides, and dialkyl thiodipropionates. In these stabilizers, the alkyl groups may contain 1-18 carbon atoms. Mixtures of stabilizers may also be advantageously used. The stabilizer is used in amounts in the range of 0.1 to 5% of the polypropylene.

Waxes which provide the desired lubricating properties for the composition of this invention are high melting waxes meltable below about 300° F. and include candelilla wax, high-melting paraffin wax, carnauba wax, microcrystalline wax, Japan wax and montan wax. Other useful waxes which are suitable are well known in the phonograph record art. Waxes melting in the range of about 150° F. to about 220° F. are preferred.

Fillers which are useful in the compositions used in this invention and which are advantageous in either small or large amounts and which are particularly well tolerated in large amounts include: China clay, and other fine clays, slate flour, barytes or precipitated barium sulfate, kieselguhr, silica powder, marble flour, whiting, metal oxides such as titanium dioxide, zinc oxide, carbon black. These fillers are phonograph record grade fillers and are used in very fine powder form for the highest fidelity, preferably less than 0.5 micron size. These fillers may be used in amounts up to about 75% of the composition.

The phonograph record compositions of this invention depend upon the plastic composition of polypropylene blended with a heat stabilizer for their advantages over the art. Small amounts of thermoplastic fluxing resins already known in the art may be used for imparting fluidity where needed, as in highly filled compositions. For instance, small amounts of polyvinyl acetate-chloride, petroleum hydrocarbon resins, coumarone-indene resins, rosin derivatives, and the like, may be used as part of the binder component of the compositions. However, large amounts of such resins will reduce the tolerance for fillers with respect to flexibility which the polypropylene imparts. For this reason, when resins are included in the binder component, the resin should be substantially less than 50% of the binder component and preferably less than about 25% of the binder component, and the polypropylene should be at least about 50% and preferably at least about 75% of the binder component of the filled phonograph record.

Table 1

| Example | 1 | 2 | 3 | 4 | 5 | 6 | 7 | 8 | 9 |
|---|---|---|---|---|---|---|---|---|---|
| Composition (parts by weight): | | | | | | | | | |
| Polypropylene RSV 1.5 | 100 | | | | | | | | |
| Polypropylene RSV 2 | | 100 | | | | | | | |
| Polypropylene RSV 3 | | | 100 | | | 100 | | | |
| Polypropylene RSV 4.5 | | | | 100 | | | | 90 | 100 |
| Polypropylene RSV 5 | | | | | 100 | | 100 | | |
| Diisooctyl phthalate | | | | | | | | 10 | |
| Stabilizers (heat and light): | | | | | | | | | |
| Di(octylphenol) sulfide | 0.2 | | | | | | 0.2 | | |
| Di-t-butyl-p-cresol | | | | | | 0.5 | | | |
| Chroman* | | 0.1 | 0.1 | 0.1 | 0.2 | | 0.1 | 0.1 | 0.1 |
| Dilauryl thiodipropionate | | 0.25 | 0.25 | 0.25 | 0.25 | | 0.25 | 0.25 | 0.25 |
| Calcium stearate | 0.4 | 0.4 | 0.4 | 0.4 | 0.4 | 0.4 | 0.4 | 0.4 | 0.4 |
| Wax: | | | | | | | | | |
| Carnauba | | | | | | | 4.8 | | |
| Microcrystalline 100° F | 2 | | 2 | 2 | 2 | 2 | | | |
| Process: | | | | | | | | | |
| Mill temperature, ° F | 330 | 330 | 330 | 330 | 330 | 330 | 330 | 330 | 330 |
| Mill time (minutes) | 10 | 10 | 10 | 10 | 10 | 10 | 45 | 30 | 15 |
| Press temperature, ° F | 280 | 300 | 280 | 330 | 330 | 280 | 330 | 300 | 330 |
| Press time (seconds) | 5 | 5 | 5 | 5 | 5 | 5 | 5 | 5 | 5 |
| Cooling time (seconds) | 25 | 25 | 25 | 55 | 55 | 25 | 20 | 25 | 20 |

*Nonyl phenol-acetone condensation product containing about 23% 2(2'-hydroxyphenyl)-2,4,4-trimethyl-5',6-dinonylchroman and 34% 2,2'-isopropylidenebis(4-nonyl phenol).

Table 2

| Example | 10 | 11 | 12 | 13 | 14 | 15 | 16 | 17 | 18 | 19 |
|---|---|---|---|---|---|---|---|---|---|---|
| Composition (parts by weight): | | | | | | | | | | |
| Polypropylene RSV 3.5 | 25 | 50 | 75 | 42 | 25 | 38 | 48 | 60 | 50 | 48.8 |
| Stabilizer (heat and light): | | | | | | | | | | |
| A—nonyl phenol-acetone condensation product of Table 1 | 0.025 | 0.05 | 0.075 | 0.04 | 0.025 | 0.038 | 0.048 | | | |
| B—dilauryl thiodipropionate | 0.063 | 0.13 | 0.188 | 0.1 | 0.063 | 0.095 | 0.12 | | | |
| C—di(octylphenol) sulfide | | | | | | | | 0.2 | 0.2 | 0.2 |
| Calcium stearate | 0.1 | 0.2 | 0.3 | 0.2 | 0.1 | 0.15 | 0.2 | | | |
| Filler: | | | | | | | | | | |
| Calcium carbonate, 0.1 micron | | | | 33 | 54 | 37 | 45 | 35 | 4.8 | 36 |
| Carbon black, 0.1 micron | 75 | 50 | 25 | | 1 | | | 4.8 | 43.0 | |
| Silica | | | | | | | | | | |
| Resins: | | | | | | | | | | |
| Polyvinyl acetate-chloride | | | | 8 | | 8 | | | | 8 |
| Petroleum hydrocarbon resin | | | | 15 | 18 | 15 | 5 | | | 5 |
| Wax: | | | | | | | | | | |
| Paraffin M.P., 190° F | | | | 2 | 2 | 2 | 2 | | | 2 |
| Carnauba | | | | | | | | | 2 | |
| Process: | | | | | | | | | | |
| Mill temperature, ° F | 330 | 330 | 330 | 330 | 330 | 330 | 330 | 330 | | 330 |
| Mill time (minutes) | 38 | 38 | 25 | 15 | 15 | 15 | 15 | 30 | | 15 |
| Press temperature, ° F | 310 | 310 | 270 | 280 | 280 | 280 | 280 | 315 | | 280 |
| Press time (seconds) | 5 | 5 | 5 | 5 | 5 | 5 | 5 | 15 | | 5 |
| Cooling time (seconds) | 25 | 25 | 25 | 25 | 25 | 25 | 25 | 120 | | 25 |
| Record Properties: | | | | | | | | | | |
| Flexural strength (approx.) | 5,900 | 7,800 | 8,600 | 7,500 | 5,000 | 6,000 | 7,500 | | | 6,500 |
| Angle of bend (degrees) | 7 | 51 | 65 | 45 | 15 | 20 | 50 | | | 45 |
| Hardness (Rockwell) | 109 | 102 | 104 | 108 | 109 | 105 | 102 | 102 | | 102 |

What I claim and desire to protect by Letters Patent is:

1. As an article of manufacture, a phonograph record the reproducing surfaces of which consist essentially of linear polypropylene having an RSV in the range of 1.5–5 containing a heat stabilizer therefor in an amount in the range of 0.1–5% by weight of said polypropylene and a filler of particle size less than about 0.5 micron in an amount up to 75% of the combined weight of said polypropylene, stabilizer and filler.

2. As an article of manufacture, a phonograph record the reproducing surfaces of which consist essentially of linear polypropylene having an RSV in the range of 1.5–5 containing a heat stabilizer therefor in an amount in the range of 0.1–5% by weight of said polypropylene, a hard wax melting below about 300° F. in an amount up to about 15% by weight of said polypropylene and a filler of particle size less than about 0.5 micron in an amount up to 75% of the combined weight of said polypropylene, stabilizer, wax and filler.

3. A phonograph record of claim 1 in which the polypropylene has an RSV in the range of about 2–3.5.

References Cited in the file of this patent

UNITED STATES PATENTS

| | | |
|---|---|---|
| 2,116,986 | Stose | May 10, 1938 |
| 2,127,381 | Herrmann et al. | Aug. 16, 1938 |
| 2,508,893 | Sadowski et al. | May 23, 1950 |
| 2,572,798 | Ayers | Oct. 23, 1951 |
| 2,605,506 | Miller | Aug. 5, 1952 |
| 2,613,152 | Doyle et al. | Oct. 7, 1952 |
| 2,649,622 | Piccard | Aug. 25, 1953 |
| 2,675,366 | Pullman | Apr. 13, 1954 |
| 2,681,323 | Groff et al. | June 15, 1954 |
| 2,957,849 | Kennedy | Oct. 25, 1960 |
| 2,997,451 | Miller | Aug. 22, 1961 |

OTHER REFERENCES

Ottolenghi et al.: Modern Plastics (Encyclopedia Issue for 1959), vol. 36, No. 1A, pp. 139–140 (September 1958).